United States Patent
Huang et al.

(10) Patent No.: US 12,111,773 B2
(45) Date of Patent: Oct. 8, 2024

(54) RUNTIME PROTECTION OF SENSITIVE DATA

(71) Applicant: International Business Machines Corporation, Armonk, NY (US)

(72) Inventors: He Huang, Beijing (CN); Jin Hong Fu, Beijing (CN); Shi Chong Ma, Beijing (CN); Bao Zhang, Beijing (CN); Jia Yu, Beijing (CN); Peng Hui Jiang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/930,439

(22) Filed: Sep. 8, 2022

(65) Prior Publication Data
US 2024/0086333 A1    Mar. 14, 2024

(51) Int. Cl.
G06F 12/10        (2016.01)
G06F 12/1036      (2016.01)
G06F 12/14        (2006.01)
G06F 21/62        (2013.01)

(52) U.S. Cl.
CPC ........ G06F 12/1036 (2013.01); G06F 12/145 (2013.01); G06F 21/6254 (2013.01)

(58) Field of Classification Search
CPC .... G06F 12/10; G06F 12/1036; G06F 12/145; G06F 21/6254; G06F 12/08; G06F 12/0815; G06F 12/0207; G06F 12/0891; G06F 12/12; G06F 12/14
See application file for complete search history.

(56) References Cited

U.S. PATENT DOCUMENTS

| | | | |
|---|---|---|---|
| 8,639,896 B2 | 1/2014 | Bank | |
| 8,645,763 B2 | 2/2014 | Szegedi | |
| 8,918,867 B1* | 12/2014 | Salour | G06F 21/6245 |
| | | | 726/22 |
| 9,021,605 B2 | 4/2015 | Blue | |
| 9,589,146 B2 | 3/2017 | Averdunk | |
| 9,852,303 B2 | 12/2017 | Feng | |
| 11,263,015 B1* | 3/2022 | Mukherjee | G06F 9/3851 |

(Continued)

FOREIGN PATENT DOCUMENTS

WO    WO-2022105610 A1 *    5/2022    ............. G06F 21/53

OTHER PUBLICATIONS

Z. Bai, L. Wang, J. Chen, L. Xu, J. Liu and X. Liu, "DTAD: A Dynamic Taint Analysis Detector for Information Security," 2008 The Ninth International Conference on Web-Age Information Management, Zhangjiajie, China, 2008, pp. 591-597.*

(Continued)

*Primary Examiner* — Pierre Michel Bataille
(74) *Attorney, Agent, or Firm* — David K. Mattheis (57) ABSTRACT

A computer-implemented method, computer program product and computer system are provided. A processor receives an indication of sensitive data in one or more files. A processor updates at least one bit in the virtual address space for the one or more files indicated to have sensitive data. A processor, in response to a program accessing the one or more files, evaluates a respective virtual address for the one or more files. A processor, in response to the at least one bit in the respective virtual address for the one or more files, marks intermediate data generated by the program as sensitive data.

20 Claims, 4 Drawing Sheets

(56) References Cited

U.S. PATENT DOCUMENTS

| | | | |
|---|---|---|---|
| 2008/0172745 | A1 | 7/2008 | Reinart |
| 2010/0251036 | A1* | 9/2010 | Moyer ................ G06F 11/1064 |
| | | | 714/53 |
| 2011/0145918 | A1* | 6/2011 | Jung ...................... G06F 21/52 |
| | | | 726/22 |
| 2012/0259877 | A1 | 10/2012 | Raghunathan |
| 2014/0032816 | A1* | 1/2014 | Lin ..................... G06F 12/1425 |
| | | | 711/E12.008 |
| 2015/0113242 | A1 | 4/2015 | Abrams |
| 2018/0046454 | A1 | 2/2018 | Young |
| 2018/0285575 | A1* | 10/2018 | Marchese ............... G06F 21/79 |
| 2019/0171846 | A1 | 6/2019 | Conikee |
| 2021/0089220 | A1* | 3/2021 | Gkoulalas-Divanis ...................... |
| | | | G06F 21/6245 |
| 2022/0245276 | A1* | 8/2022 | Gupta ................ G06F 21/6245 |
| 2023/0089331 | A1* | 3/2023 | Shachar ................ G06F 16/245 |
| | | | 726/26 |
| 2023/0289465 | A1* | 9/2023 | Hu ...................... G06F 21/6227 |

OTHER PUBLICATIONS

Dilmegani, Cem, "Top 8 Data Masking Techniques", updated on Apr. 3, 2022, 15 pages, <https://research.aimultiple.com/data-masking/>.

Malliaros et al., "Protecting Sensitive Information in the Volatile Memory from Disclosure Attacks", printed on Apr. 8, 2022, 7 pages.

Palit et al., "Mitigating Data-only Attacks by Protecting Memory-resident Sensitive Data", ASAC '19, Dec. 9-13, 2019, San Juan, PR, USA, © 2019, 14 pages.

Ross, Candy, "2 Ways to Keep Your Sensitive Files Safe on a USB drive or HDD", Feb. 3, 2019, KRUPTOS2 Software, 10 pages.

* cited by examiner

RUNTIME PROTECTION OF SENSITIVE DATA

BACKGROUND OF THE INVENTION

The present invention relates generally to the field of data security, and more particularly to evaluating sensitive data at runtime for use by a computing system.

Data security is the practice of protecting digital information from unauthorized access, corruption, or theft. Data security encompasses every aspect of information security from the physical security of hardware and storage devices to administrative and access controls, as well as the logical security of software applications. When properly implemented, data security strategies will protect an organization's information assets against cybercriminal activities, but they also guard against insider threats and human error, which remains among the leading causes of data breaches today.

SUMMARY

Embodiments of the present invention provide a method, system, and program product to monitor and control access to sensitive data used by other programs are provided. A computer-implemented method, computer program product and computer system are provided. A processor receives an indication of sensitive data in one or more files. A processor updates at least one bit in the virtual address space for the one or more files indicated to have sensitive data. A processor, in response to a program accessing the one or more files, evaluates a respective virtual address for the one or more files. A processor, in response to the at least one bit in the respective virtual address for the one or more files, marks intermediate data generated by the program as sensitive data.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
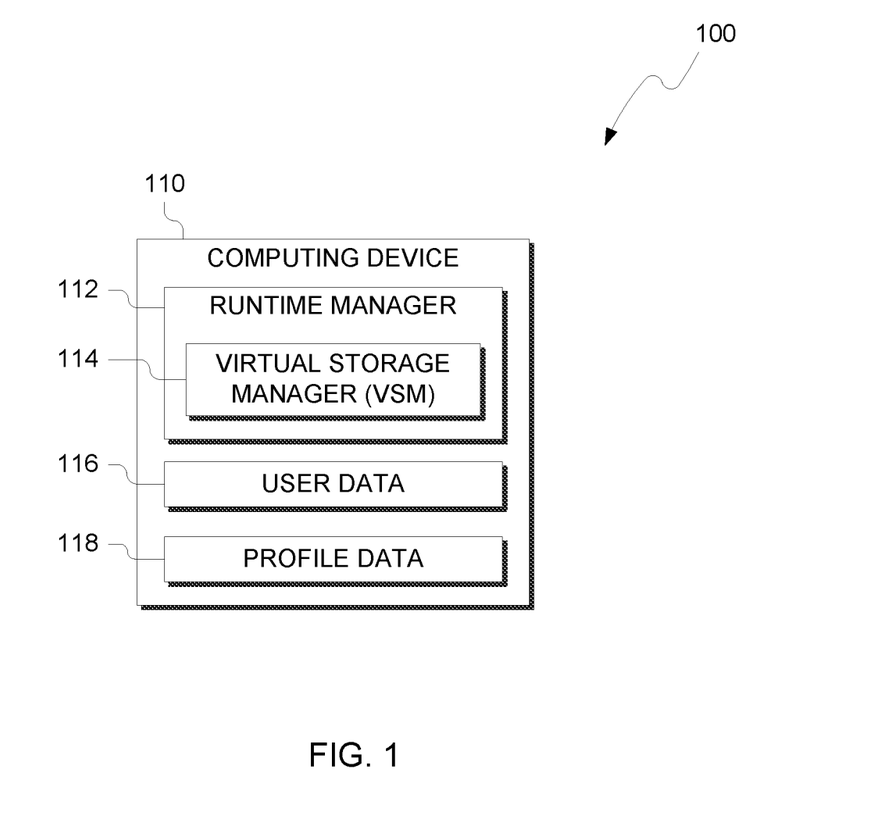
FIG. 1 is a functional block diagram illustrating a computing environment, in accordance with an exemplary embodiment of the present invention.

The present invention will now be described in detail with reference to the Figures. FIG. 1 is a functional block diagram illustrating computing environment, generally designated 100, in accordance with one embodiment of the present invention. Computing environment 100 includes computing device 110. Computing device 110 includes runtime manager program 112, virtual storage manager 114, user data 116 and profile data 118.

In various embodiments of the present invention, computing device 110 can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to runtime manager program 112, virtual storage manager 114, user data 116 and profile data 118. Computing device 110 may include internal and external hardware components, as depicted and described in further detail with respect to FIG. 4.

In this exemplary embodiment, runtime manager program 112, virtual storage manager 114, user data 116 and profile data 118 are stored on computing device 110. However, in other embodiments, runtime manager program 112, virtual storage manager 114, user data 116 and profile data 118 may be stored externally and accessed through a communication network, such as network WAN 402. WAN 402 can be, for example, a local area network (LAN), a wide area network (WAN) such as the Internet, or a combination of the two, and may include wired, wireless, fiber optic or any other connection known in the art. In general, WAN 402 can be any combination of connections and protocols that will support communications between computing device 110 and other connected devices (not shown), in accordance with a desired embodiment of the present invention In various embodiments, computing device 110 includes runtime manager 112. Runtime manger 112 performs various operations to execute programs within an operating system, such as scheduling tasks, allocating resources to programs and passing along data to other programs. In various embodiments, programs managed by runtime manager may request user data 116. User data 116 is any data created or otherwise belonging to a user. As will be discussed, user data 116 may include data marked as sensitive. Sensitive user data is user data 116 that the user has indicated runtime manger 112 to carefully handle when utilizing such sensitive data, such as copying or reading the sensitive data. For example, a user may indicate that a spreadsheet file with employee addresses is sensitive data.

As discussed herein, when runtime manager 112 retrieves, copies, sends or otherwise interacts with data from user data 116, the utilized user data 116 is referred to as intermediate data. When data is combined or manipulated by operations of a program, intermediate data is generated. Embodiments of the present invention evaluates intermediate data for sensitive user data 116. For example, error events and other interrupts during execution of a program may invoke a data dump for error logging. This data dump may also include sensitive user data 116 if it was being used during the error.

In various embodiments, user data 116 includes a portion of data that represents a file. For example, a certain number of bytes in user data 116 represents the data needed to construct an image. Additionally, user data 116 includes virtual memory addresses for files. As will be discussed herein, runtime manager 112 deploys virtual memory to refer to user data 116. Virtual memory is a logical address that corresponds to a physical location in user data 116 where certain data resides. By design, virtual memory has a larger address space than physical memory and is typically used to expand the amount of system memory (e.g., the amount of Random-Access Memory (RAM)).

Embodiments of the present invention provide a unique solution to data security. Prior solutions required any intermediate data that contained sensitive user data 116 to be completely removed. Other solutions include placing tags or other metadata into the file portion of user data 116, which requires applications to be developed to specifically handle and account for sensitive data tags. Embodiments of the present invention recognize that by using an unused bit in the virtual address space, improvements to data security for intermediate data are provided.

In various embodiments, runtime manager 112 includes virtual storage manager 114. Virtual storage manager (VSM) 114 generates and maintains a virtual address space for user data 116. As previously discussed, a virtual address space appends additional addressing bytes to expand the perceived "available" amount of memory to computing device 110. Embodiments of the present invention recognize that by using a bit from the virtual memory address space, an indication of sensitive user data 116 can be provided to runtime manager 112. The bit indicates if the data stored in the address space contains sensitive data or not. As discussed herein, any bit, byte or portion of the virtual address scheme, which is not used to express or represent a virtual address, can be used to mark the data in the address range as containing sensitive data. Additionally, any bit, byte or portion of the virtual address scheme can be used to mark the related file as counting sensitive data is referred to herein as the "sensitive bit". In some scenarios, the most significant bit in the virtual address is selected to be the sensitive bit. However, one of ordinary skill in the art will appreciate any portion of the virtual address space may be used as the sensitive bit without deviating from the invention.

Previous inventions require users to directly mark files as sensitive and typically store that indication as metadata. However, if a user program utilizes sensitive files, the metadata would need to be copied to ensure compliance and proper handling of intermediate and output data that is based on the sensitive files. Embodiments of the present invention, provide an efficient way to protect the derived intermediate data. By utilizing a bit or some portion of the address schema to mark if the current address contains sensitive data, embodiments of the present invention can determine, on a memory access level, sensitive files and also determine, when passing along sensitive files, that derived intermediate data and output data from the user program also contains sensitive files and data.

In some embodiments, a user marks or otherwise indicates which files in user data 116 include sensitive data. In other embodiments, runtime manger 112 automatically evaluates user data 116 for sensitive data. In some scenarios, runtime manger 112 has access to a knowledge database (not shown) which lists known sensitive data values (e.g., addresses, proper names, and the like). By comparing the knowledge database to parts of user data 116, runtime manager 112 automatically identifies sensitive data. In other scenarios, runtime manager 112 has access to unsupervised-trained artificial intelligence (AI) classification model. The trained AI classification model is trained in an unsupervised manner. To accomplish the self-training of the classification model, data-masking algorithm evaluates data sets to determine if data should be masked or hidden in public records. The classification model can us the data-masking algorithm to be trained to classify raw data as one or more types of sensitive data such as, but not limited to, personally identifiable information, protected health information, payment card information, intellectual property and the like. Typically, data-masking algorithms are used to redact sensitive information, however, in various embodiments, runtime manger 112 utilizes the data-masking algorithm for identification of sensitive data.

Once user data 116 is indicated as sensitive, runtime manager 112 updates the sensitive bit in the virtual address to reflect that the corresponding data are marked sensitive. When applications refer to user data 116, VSM 114 will inspect the sensitive bit to see if any address references by an accessed file includes sensitive data. In response to identifying an address requested by an application includes sensitive data, VSM 114 notifies runtime manager 112 of the reference. In response, runtime manager 112 retrieves a classification model. The classification model is a neural network or other artificial-intelligence derived classification model that has been trained to compare the initial data that is marked sensitive to any intermediate or output data derived from the initial sensitive data. The classification model determines a value that indicates how similar the initial sensitive data to any intermediate or output data that utilizes the initial data. If the similarity value between the initial data and the intermediate or output data is above a threshold value, then runtime manager 112 determines the intermediate or output data also contains sensitive data.

In various embodiments, while sensitive data may be used, the intermediate data may be properly scrubbed or cleaned for non-sensitive data operations. As such, runtime manger 112 compares the original sensitive user data 116 to any intermediate data used by the applications. For example, runtime manager 112 invokes a runtime "exit" command which terminates the application to inspect the intermediate data generated by the application. As discussed herein, an AI classification model for data-masking can be deployed to identify if the intermediate data includes any sensitive data.

In scenarios where the intermediate data still includes sensitive data, runtime manager 112 marks the sensitive bit for the address that stores intermediate data. In some scenarios, runtime manager 112 also sets intermediate data to point to or otherwise refences the original data. If the intermediate data does not include sensitive data, then runtime manager 112 permits the application to utilize the intermediate data. As discussed above, runtime manger 112 access a trained classification model to determine if intermediate or output data matches data marked as sensitive in user data 116. In various embodiments, runtime manager 112 provides shared memory for intermediate data to be exchanged by programs monitored by runtime manager 112. When a program shares intermediate data that utilizes sensitive user data 116, runtime manager creates a secure space in shared memory for the applications to securely exchange intermediate data. The secure space creates an isolated or sandboxed environment for the program to execute within. The memory space visible to the program is not accessible to other programs. Additionally, runtime manager 112 limits the access the program has to other parts of memory and storage on computing device 110.

In various embodiments, runtime manager 112 maintains profile data 118 for each sensitive data access indicated by VSM 114 for any reference to sensitive user data 116. Runtime Manager 112 maintains a stack of calls to access sensitive user data 116. Based on the calls in the stack, runtime manager 112 generates profile data 118. Profile data 118 indicates programs that initiate access to sensitive user data 116, as well as any intermediate programs or functions that where given access to intermediate data from the initial program that accesses the sensitive user data 116.

Figure 2:
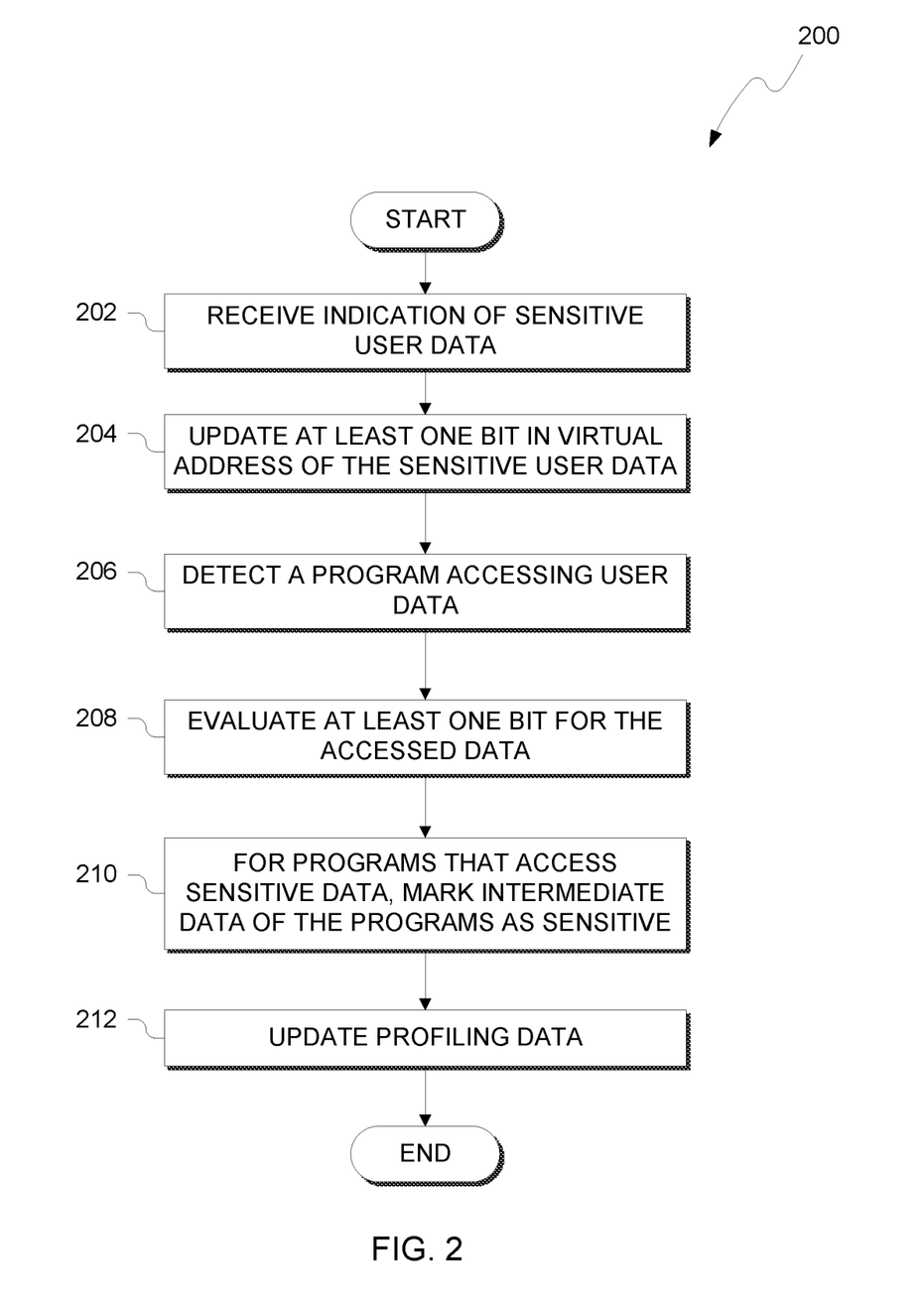
FIG. 2 illustrates operational processes of runtime manager on a computing device within the environment of FIG. 1, in accordance with an exemplary embodiment of the present invention.

FIG. 2 illustrates operational processes, designated as 200, of runtime manager 112 on computing device 110 within the environment of FIG. 1. In process 202, runtime manager 112 receives an indication of sensitive user data 116. In some scenarios, a user provides input to indicate which files in user data 116 contain sensitive information. In other scenarios, runtime manager 112 determines user data 116 that contains sensitive information by scanning the contents of the files in user data 116. For example, runtime manger 112 deploys a data-masking AI classification model to determine if files or parts of files contain sensitive information.

In process 204, runtime manager 112 updates at least one bit in the virtual address of any files that have been indicated as containing sensitive data. As discussed herein, runtime manager 112 sets at least one bit in the virtual address space to indicate that user data 116 contains sensitive information. In process 206, the VSM 114 of runtime manager 112 constantly monitors the user data 116 requested by programs. In process 208, when files from user data 116 are accessed by programs, the VSM 114 of runtime manager 112 evaluates the at least one reserved bit in the virtual address space to determine if the data to be accessed by a program contains sensitive data.

In process 210, for programs that access sensitive data, runtime manager 112 marks any intermediate data generated by the program to be sensitive as well. Additionally, any output produced by the programs that access sensitive data will be marked by runtime manager 112 as sensitive. When intermediate or output data is marked sensitive, runtime manager 112 may place restrictions of the data such as, but not limited to, preventing copying or moving of the data, masking or scrubbing of the data, or preventing network access to the data.

Figure 3:
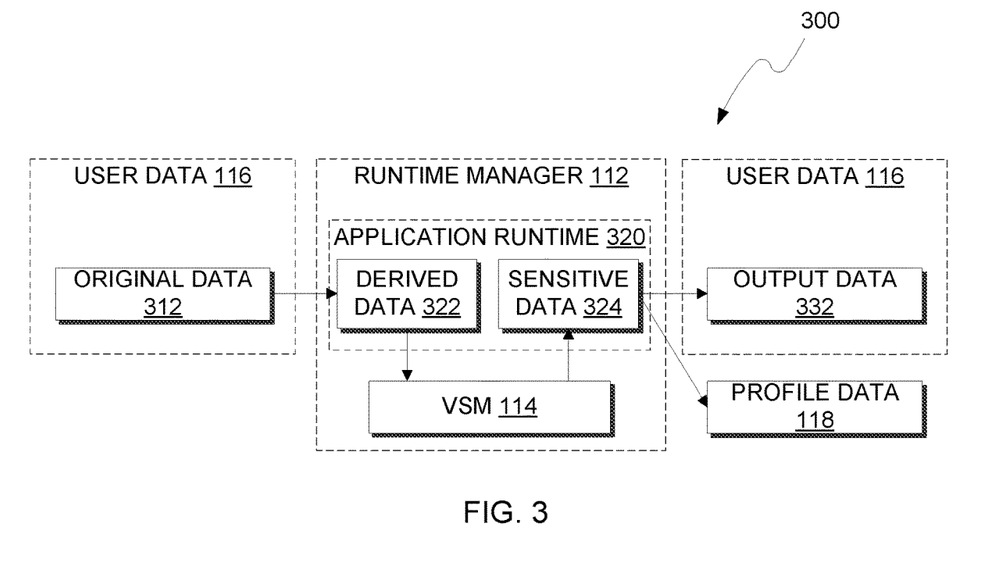
FIG. 3 is a system diagram illustrating runtime data protection, in accordance with an exemplary embodiment of the present invention.

In process 212, runtime manager 112 updates profiling data for the programs that use sensitive user data 116. Runtime manager 112 routinely reads the stack of sensitive data calls and generates profiles for application and programs based on the calls for sensitive data the respective applications requested. Runtime manager 112 creates an identifier for each application that runtime manager 112 instantiates. When the applications request sensitive data application, runtime manager 112 generates a profile entry for the application that indicates the identifier and addresses accessed, updating profile data 118 with a record of the access of sensitive data. If an application routinely accessed sensitive data, then runtime manager 112 updates profile data 118 to indicate the frequent use of sensitive data. In some scenarios, runtime manger 112 may automatically permit applications access to sensitive data. If an application properly generates intermediate data or output data that does not contain original sensitive data, then runtime manger 112 may automatically permit the application access in future requests. If an application generates intermediate data or output data that includes sensitive data, then manger 112 may automatically deny permission to writing the sensitive data by the application or generate an alert for the user to review the behavior of the application. The profiling file can be used by users to verify if the sensitive data is used by granted routines. The profiling file can be used by users to tag the granted function automatically FIG. 3 is a system diagram, designated as 300, illustrating runtime data protection. In various embodiments, a user stores data in user data 116. Original data 312 indicates user data 116 stored on computing device 110. In some instances, original data 312 may be derived or retrieved from other data sources, the term original as used herein indicates that the data originates from a user's input or instruction or is otherwise a file in or portion of storage in user data 116. As discussed herein, user data 116 may contain data that is marked as sensitive. IN some scenarios, a user provides indication to runtime manager regarding which files contain sensitive data. In other scenarios, runtime manager 112 inspects data in user data 116 to determine if the files contain sensitive data.

As applications are initiated and executed, runtime manager 112 provides application runtime 320. Application runtime 320 creates an environment where system or process memory to execute the application is protected and isolated from other application runtimes that may be ongoing at runtime. As application runtime 320 executes the application, runtime manager 112 tracks any data that originates from user data 116 (i.e., original data 312) as derived data 322. Derived data 322 is protected as part of application runtime 320.

As discussed herein, virtual storage manager (VSM) 114 facilitates addressing of user data 116. As data is derived or used in an application VSM inspects the virtual memory address from the derived data 322 to see if the data includes sensitive data. For example, the most significant bit in the virtual memory address can be reserved to indicate if data, at the byte or word level, contains sensitive data. The derived data 322 will inherit the addressing portion if copied or provided as pointer, indicating the data is sensitive data 324. If the data is copied or created during runtime, yet still includes references to original data 312, VSM 114 will mark the receptive derived data 322 as sensitive data 324.

In scenarios where application runtime 320 requests writing sensitive data 324 as output data 332 to user data 116, runtime manager 112 will mark output data 332 as sensitive by marking the virtual address for output data 332 (i.e., changing the reserved bit in the address). By doing so, embodiments of the present invention can maintain and ensure that sensitive user data 116 is not only protected at the file level but also for each byte, word, or unit of memory at the storage level. Applications could be developed to mark parts of files to indicate which bytes of a file contain sensitive data. In such a scenario, runtime manager 112 can provide sensitive information protection to not an entire file, but selective portions of the file such as fields in a table that contain addresses or other personal information.

In various embodiments, runtime manager 112 also monitors and records each application runtime 320 in profile data 118. In some scenarios, a user could permit certain applications unrestricted access in profile data 118. In other scenarios, a user may restrict or otherwise prevent an application from accessing sensitive data 324 or saving sensitive data 324 as output data 332. In some embodiments, runtime manager 112 monitors applications that use sensitive data 324. For example, with applications that only use sensitive data 324 as an intermediate and do not save sensitive data 324 to output data 332, runtime manager 112 may automatically permit future runtimes access to original data 312 without review of sensitivity of derived data 322.

Figure 4:
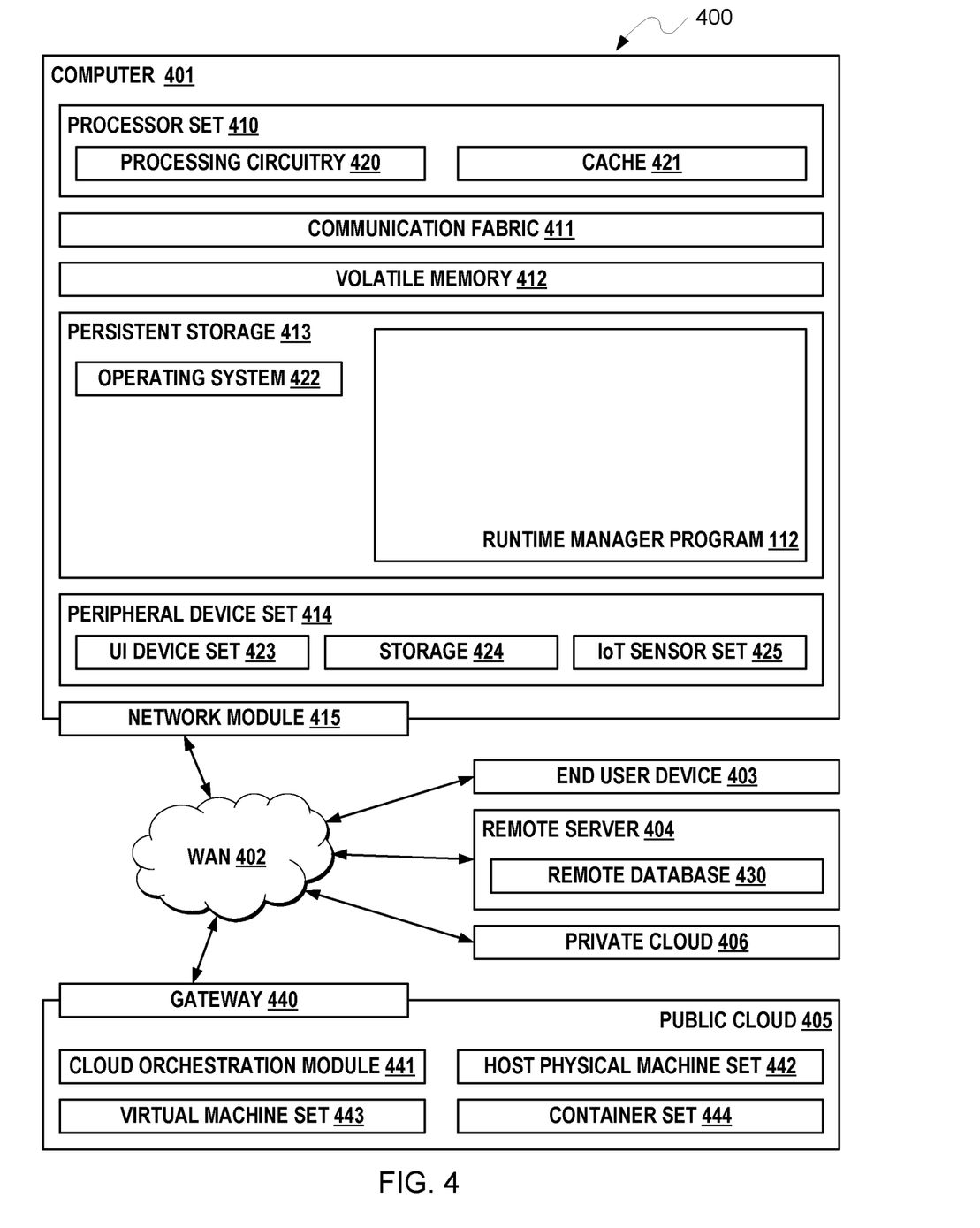
FIG. 4 depicts a block diagram of components of the computing device executing a runtime manager, in accordance with an exemplary embodiment of the present invention.

FIG. 4 depicts computing environment 400 as an example of an environment for the execution of at least some of the computer code involved in performing the inventive methods, such as runtime manger program 112. In addition to block 200, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 200, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 200 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

What is claimed is:

1. A computer-implemented method comprising:
   receiving an indication of sensitive data in one or more files;
   updating at least one bit in a virtual address space for the one or more files indicated to have sensitive data to mark data in an address range as containing sensitive data;
   in response to a program accessing the one or more files, evaluating the respective virtual address for the one or more files;
   in response to the evaluation of the at least one bit in the respective virtual address for the one or more files indicating the presence of sensitive data, marking intermediate data generated by the program as sensitive data.

2. The computer-implemented method of claim 1, wherein the intermediate data contains a portion of the sensitive data in one or more files.

3. The computer-implemented method of claim 1, the method further comprising:
   preventing the program from writing the intermediate data as output data.

4. The computer-implemented method of claim 1, the method further comprising:
   marking any output data generated by the program that includes the intermediate data as sensitive data.

5. The computer-implemented method of claim 1, wherein marking intermediate data generated by the program as sensitive data further comprises:
   determining the intermediate data includes sensitive data based on an evaluation of the intermediate data by a trained classification model.

6. The computer-implemented method of claim 5, wherein the classification model is trained in an unsupervised manner via a data-masking algorithm.

7. The computer-implemented method of claim 1, wherein the program is executed in an isolated runtime environment.

8. A computer system comprising:
   one or more computer processors;
   one or more computer readable storage media; and
   program instructions stored on the computer readable storage media for execution by at least one of the one or more processors, the program instructions comprising:
      program instructions to receive an indication of sensitive data in one or more files;
      program instructions to update at least one bit in a virtual address space for the one or more files indicated to have sensitive data to mark data in the address range as containing sensitive data;
      program instructions, in response to a program accessing the one or more files, to evaluate the respective virtual address for the one or more files;
      program instructions, in response to the evaluation of the at least one bit in the respective virtual address for the one or more files indicating the presence of sensitive data, to mark intermediate data generated by the program as sensitive data.

9. The computer system of claim 8, wherein the intermediate data contains a portion of the sensitive data in one or more files.

10. The computer system of claim 8, the program instructions further comprising:
    program instructions to prevent the program from writing the intermediate data as output data.

11. The computer system of claim 8, the program instructions further comprising:
    program instructions to mark any output data generated by the program that includes the intermediate data as sensitive data.

12. The computer system of claim 8, wherein program instructions to mark intermediate data generated by the program as sensitive data further comprises:
    program instructions to determine the intermediate data includes sensitive data based on an evaluation of the intermediate data by a trained classification model.

13. The computer system of claim 12, wherein the classification model is trained in an unsupervised manner via a data-masking algorithm.

14. A computer program product comprising:
    one or more computer-readable storage media and program instructions stored on the one or more computer-readable storage media, the program instructions comprising:
       program instructions to receive an indication of sensitive data in one or more files;
       program instructions to update at least one bit in a virtual address space for the one or more files indicated to have sensitive data to mark data in an address range as containing sensitive data;
       program instructions, in response to a program accessing the one or more files, to evaluate the respective virtual address for the one or more files;
       program instructions, in response to the evaluation of the at least one bit in the respective virtual address for the one or more files indicating the presence of sensitive data, to mark intermediate data generated by the program as sensitive data.

15. The computer program product of claim 14, wherein the intermediate data contains a portion of the sensitive data in one or more files.

16. The computer program product of claim 14, the program instructions further comprising:
    program instructions to prevent the program from writing the intermediate data as output data.

17. The computer program product of claim 14, the program instructions further comprising:
    program instructions to mark any output data generated by the program that includes the intermediate data as sensitive data.

18. The computer program product of claim 14, wherein program instructions to mark intermediate data generated by the program as sensitive data further comprises:
    program instructions to determine the intermediate data includes sensitive data based on an evaluation of the intermediate data by a trained classification model.

19. The computer program product of claim 18, wherein the classification model is trained in an unsupervised manner via a data-masking algorithm.

20. The computer program product of claim 14, wherein the program is executed in an isolated runtime environment.

\* \* \* \* \*